United States Patent [19]
Castell et al.

[11] Patent Number: 5,363,288
[45] Date of Patent: Nov. 8, 1994

[54] PROGRAMMABLE HIGH VOLTAGE POWER SUPPLY WITH REGULATION CONFINED TO THE HIGH VOLTAGE SECTION

[75] Inventors: Karen D. Castell, Bethesda; Arthur P. Ruitberg, Germantown, both of Md.

[73] Assignee: The United States of America as represented by the Administrator of the National Aeronautics and Space Administration, Washington, D.C.

[21] Appl. No.: 41,373

[22] Filed: Apr. 1, 1993

[51] Int. Cl.⁵ ............................................ H02M 3/335
[52] U.S. Cl. ...................................................... 363/21
[58] Field of Search ..................... 363/21, 59, 60, 86; 323/265, 266, 282, 293, 297, 352–354

[56] References Cited
U.S. PATENT DOCUMENTS 3,299,276 1/1967 Buell et al. .
4,307,440 12/1981 Inoue et al. ...................... 323/282 X
4,683,415 7/1987 Zimmerman ...................... 323/282

Primary Examiner—Kristine L. Peckman
Assistant Examiner—E. To
Attorney, Agent, or Firm—Ronald F. Sandler; Robert D. Marchant; Guy M. Miller

[57] ABSTRACT

A high voltage power supply in a dc—dc converter configuration includes a pre-regulator which filters and regulates the dc input and drives an oscillator which applies, in turn, a low voltage ac signal to the low side of a step-up high voltage transformer. The high voltage side of the transformer drives a voltage multiplier which provides a stepped up dc voltage to an output filter. The output voltage is sensed by a feedback network which then controls a regulator. Both the input and output of the regulator are on the high voltage side, avoiding isolation problems. The regulator furnishes a portion of the drive to the voltage multiplier, avoiding having a regulator in series with the load with its attendant, relatively high power losses. This power supply is highly regulated, has low power consumption, a low parts count and may be manufactured at low cost. The power supply has a programmability feature that allows for the selection of a large range of output voltages.

16 Claims, 8 Drawing Sheets

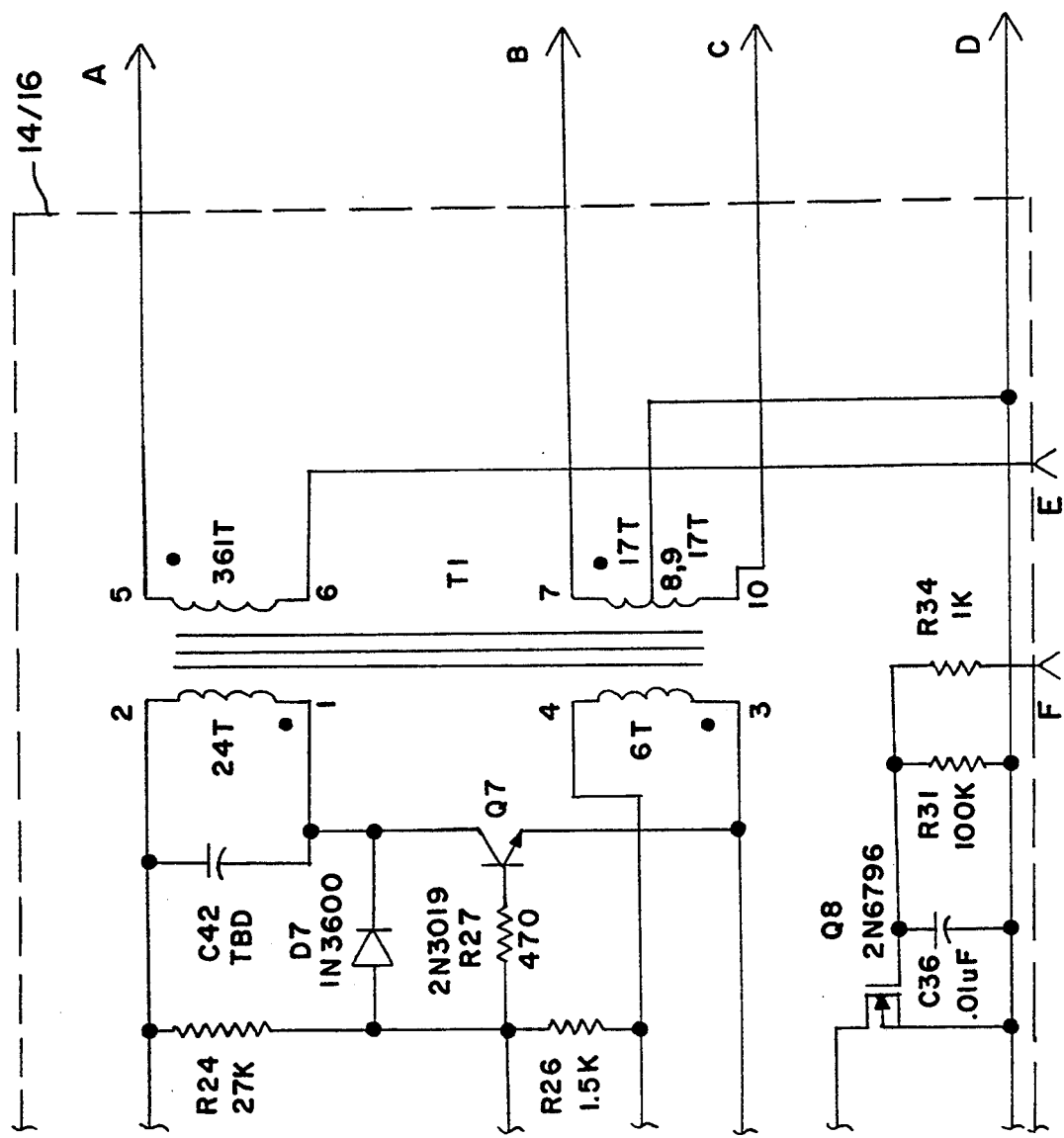
FIG.2 (CON'T)

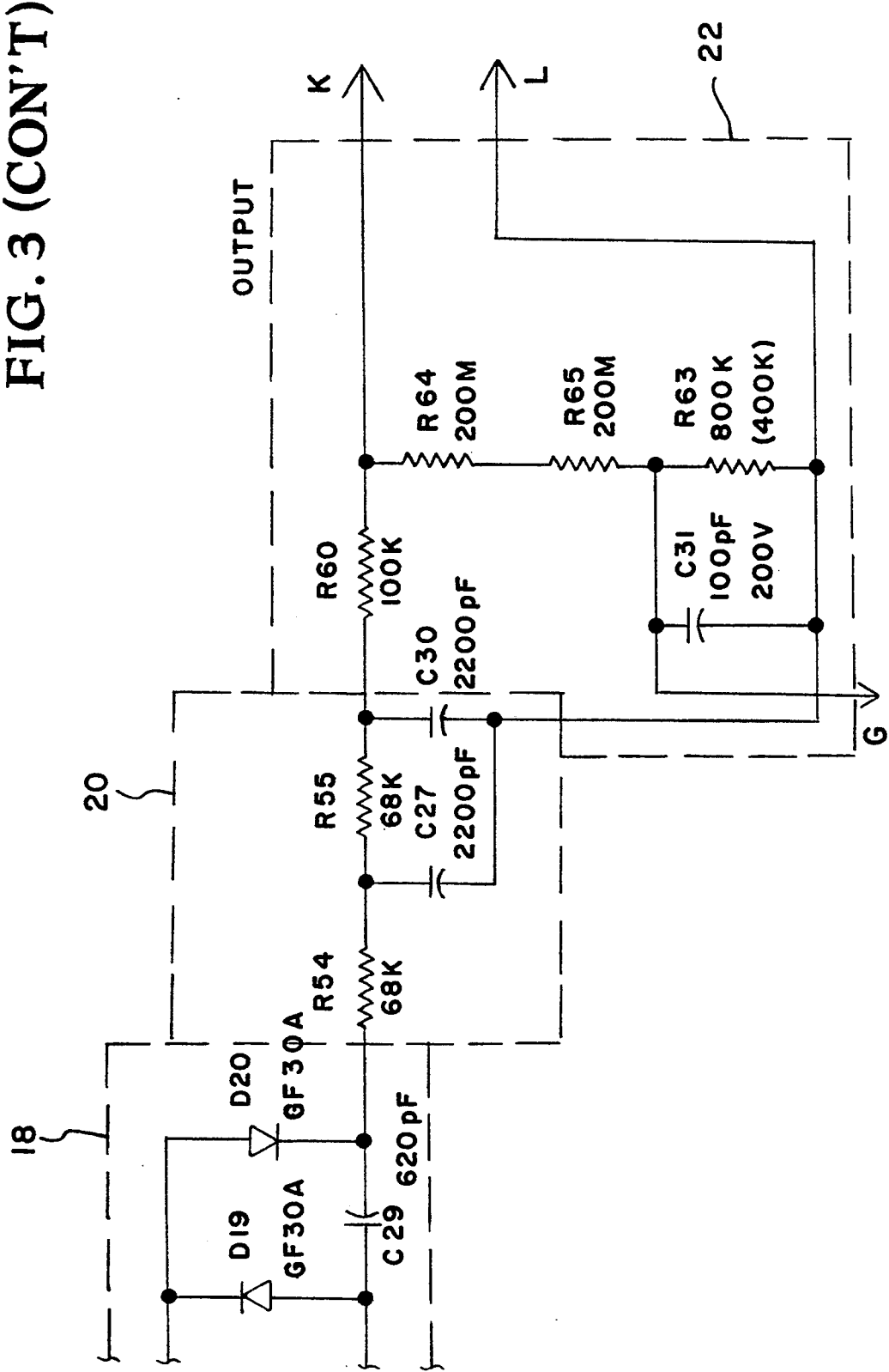
FIG. 3 (CON'T)

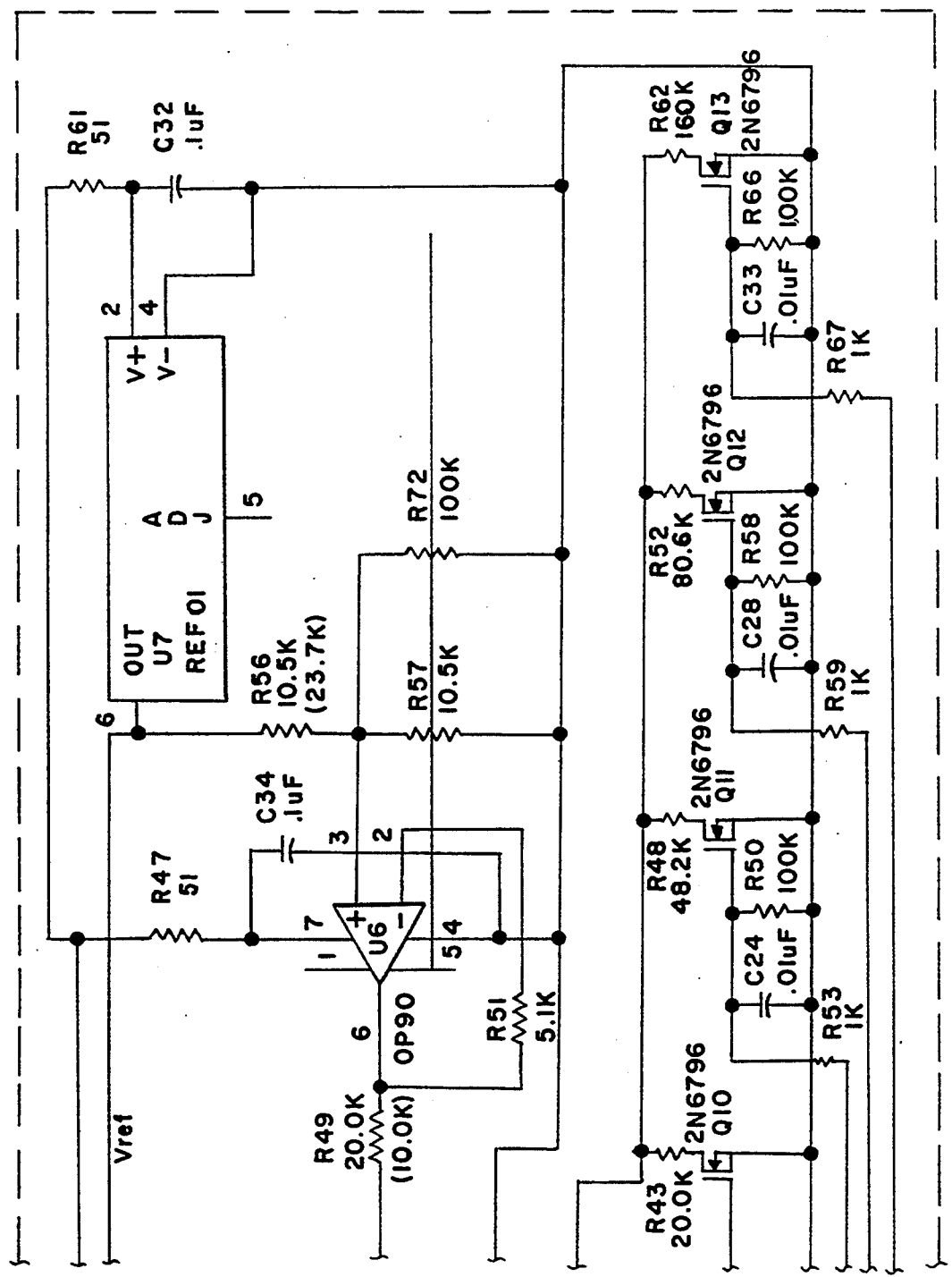
FIG. 4 (CON'T)

PROGRAMMABLE HIGH VOLTAGE POWER SUPPLY WITH REGULATION CONFINED TO THE HIGH VOLTAGE SECTION

ORIGIN OF THE INVENTION

The invention described herein was made by employees of the U.S. Government, and may be manufactured and used by or for the Government for governmental purposes without the payment of any royalties thereon or therefor.

TECHNICAL FIELD

The invention relates to high voltage power supplies, and more particularly to a voltage programmable, regulated high voltage power supply, including transformer coupling.

BACKGROUND ART

The prior art includes a number of regulated high voltage power supplies that employ, among other things, dc—dc converter techniques, including transformer coupling between the low voltage and high voltage sections. The prior art that includes regulation on the low voltage side of a dc—dc converter presents problems with respect to isolation of the regulated sensed high voltage from the low voltage side of the power supply. The prior art that includes regulation entirely on the high voltage side has generally required substantial dissipation of power in the circuit elements employed for regulation, such as with series or shunt active elements.

SUMMARY OF THE INVENTION

Accordingly, it is an object of this invention to provide an improved regulated high voltage power supply.

It is a further object of this invention to provide a regulated high voltage power supply that does not require isolation in the regulator between sensed high voltage and low voltage sections.

It is another object of this invention to provide a regulated high voltage power supply whose regulator does not dissipate substantial power.

According to the present invention, these and other objects are attained by providing a regulated high voltage power supply that employs a low power dissipation voltage regulator that is entirely contained within the high voltage section of the power supply.

DETAILED DESCRIPTION OF THE INVENTION

Figure 1:
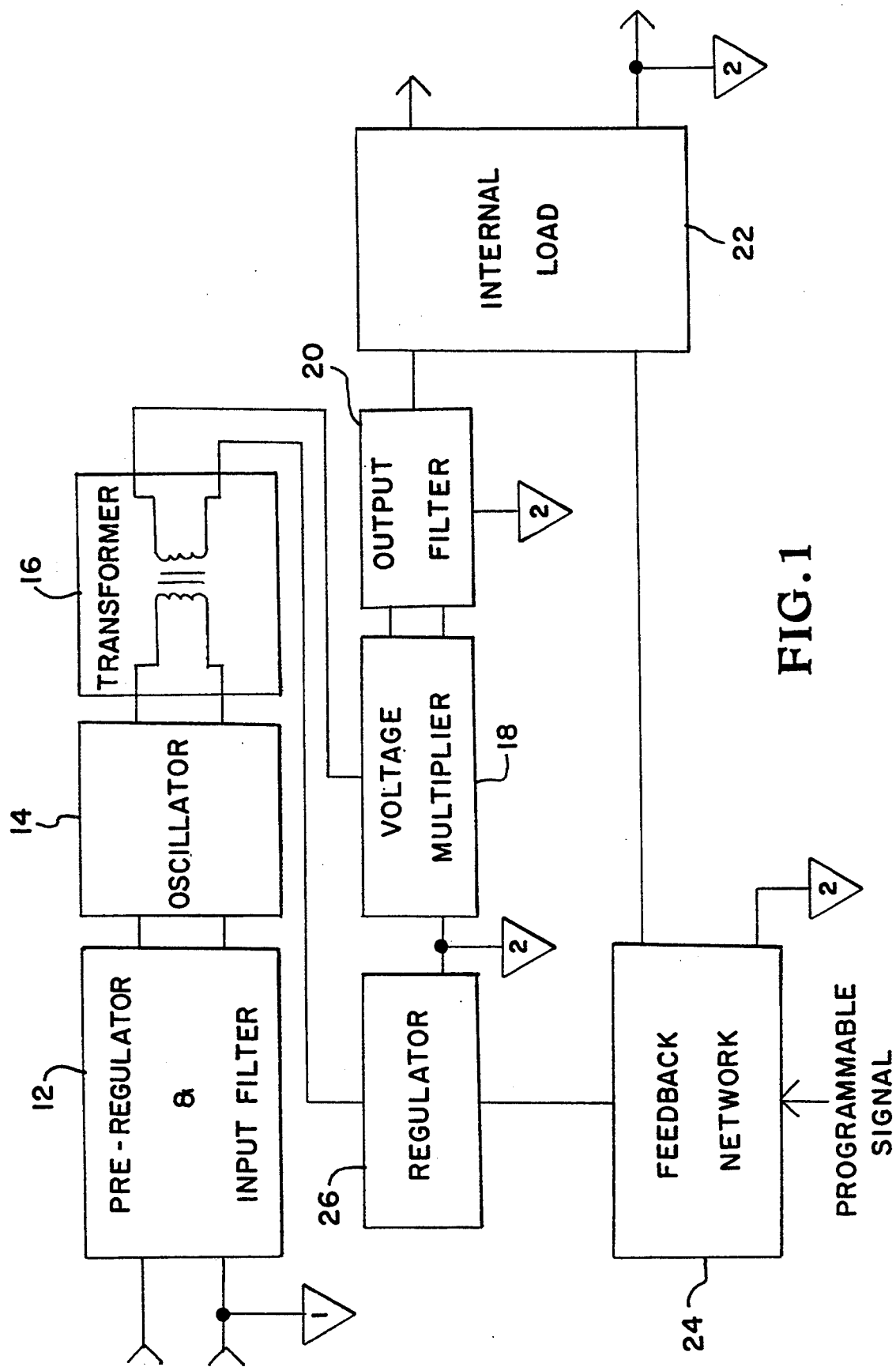
FIG. 1 is a block diagram of the regulated high voltage power supply of the present invention.

Referring now to the drawings, wherein like reference numerals and characters designate identical or corresponding parts throughout the drawings, and more particularly to FIG. 1 wherein the regulated high voltage power supply 10 of the present invention is shown as including a pre-regulator 12, oscillator 14, transformer 16, voltage multiplier 18, output filter 20, load 22, feedback network 24 and regulator 26.

As depicted, the input to the power supply is shown as +28 V dc. One use of this power supply is for spacecraft, where, in reality, the +28 V, as it appears on the spacecraft power buss, can vary between 21 V and 35 V, and is extremely noisy. Accordingly, as shown in the block diagram, pre-regulator 12 provides a constant +20 V dc input, with input current limiting and noise filtering, to oscillator 14. It should be understood that pre-regulator 12 is not critical to the invention, but was necessary for this embodiment only because of the nature of the power source. Oscillator 14 is a Hartley type oscillator designed to provide a 100 kHz sinusoidal output to allow for easier filtering, i.e., to eliminate the requirement for the filtering of high frequency waveform components, including switching glitches. The oscillator, in reality, includes step up transformer 16 that is driven on its low voltage side by a 40 V peak-to-peak waveform. The voltage on the step-up secondary or high side of the transformer is about 500 V peak-to-peak. Similarly, this particular oscillator is not critical to the invention. Any other oscillator would be acceptable as long as it did not include high frequency signal components and the fundamental oscillation frequency was such that it could be employed with the transformer.

The transformer secondary voltage drives a conventional Cockcroft-Walton voltage multiplier 18, which, in turn, produces a dc output that is approximately equal to the product of its peak-to-peak input voltage and the number of stages in the multiplier. In this instance, where the number of stages is four, the dc output voltage produced is about 4 kV dc with a ripple of about 1 V peak-to-peak. This output, from multiplier 18, is connected to output filter 20 which reduces ripple to about 10 mV peak-to-peak.

The output of filter 20 is connected to an in-place, internal load 22. Internal load 22 provides short circuit protection a divided down voltage which functions as a feedback control signal representative of the output voltage. The internal load also provides a filter for the feedback signal in order to remove high frequency components so that feedback network 24 and regulator 26 only respond to the relatively slowly varying dc signal that represents load changes. The filter capacitor also operates to absorb any transients produced from potential discharge in the high voltage assembly, thus the electronic components in the feedback network are protected from high voltage spikes. The feedback signal, which varies according to the magnitude of the high voltage output, is connected to, and used to control, feedback network 24. This network provides gain variations and signal level shifts consistent with the requirements of the regulator with the output of the network determining the amount of drive voltage going to regulator 26. The drive to the regulator 26 is inversely proportional to the level of the output voltage, which results in more conduction of the regulator 26 when the output voltage is low. This, in turn, results in an increase in the output voltage. Power supply 10 is programmable, in that a selectable digital code can be applied to the feedback network to provide a plurality of discrete high voltage outputs.

Figure 2:
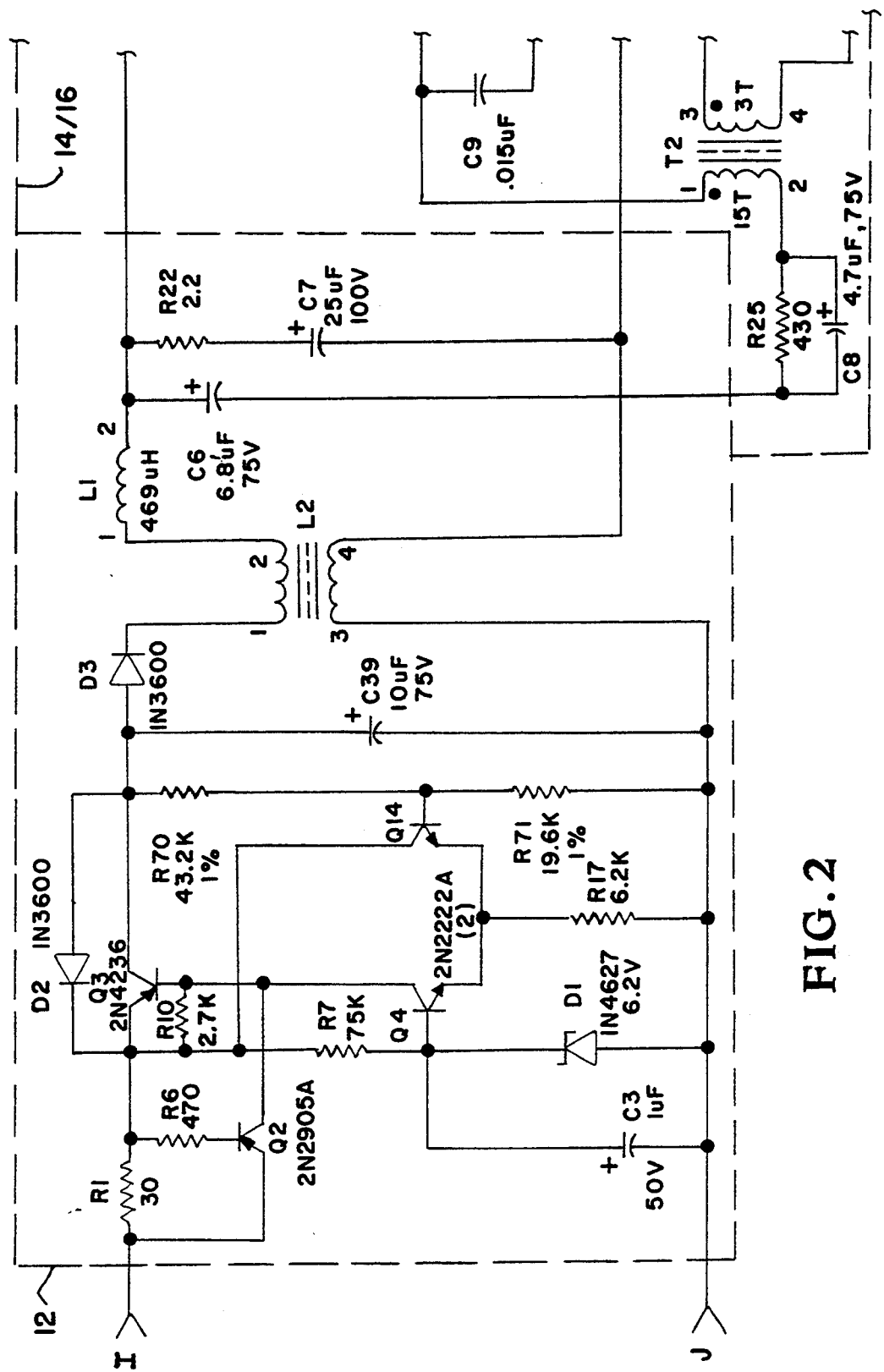
FIGS. 2 through 5 are schematic diagrams of the regulated high voltage power supply of the invention.
Figure 3:
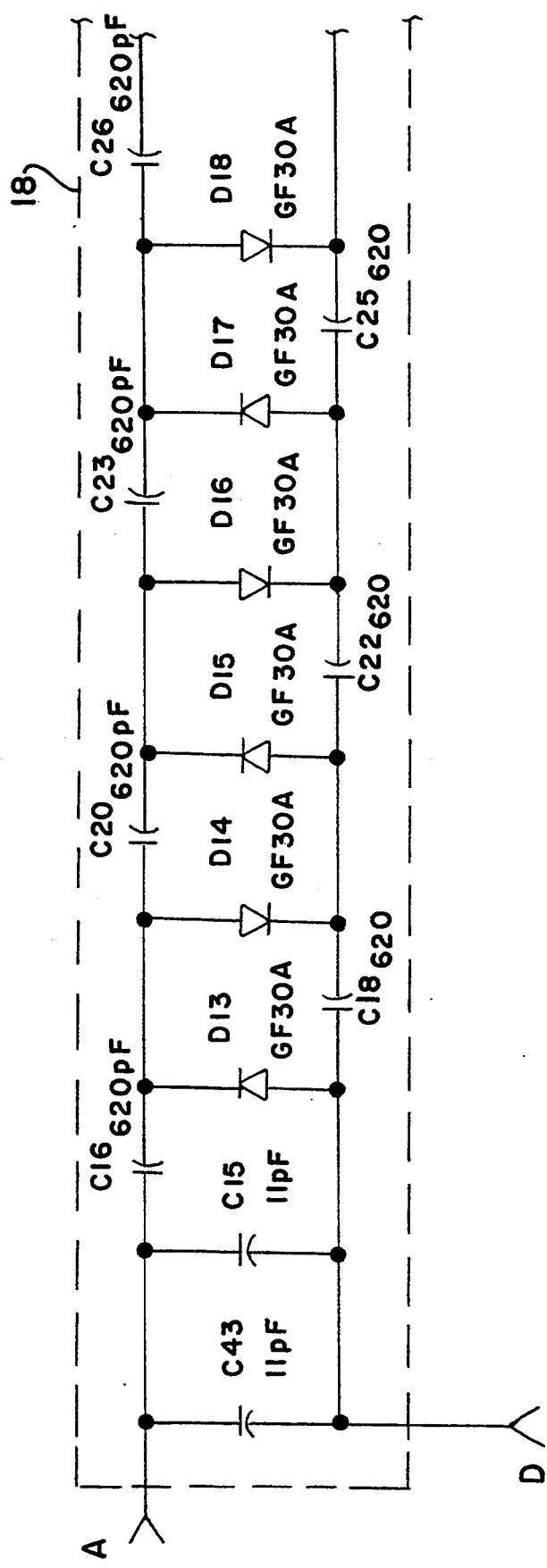

FIGS. 2 through 5 show schematic diagrams representing one embodiment of the power supply 10 depicted in the block diagram of FIG. 1. The pre-regulator 12, oscillator 14, and transformer 16 of FIG. 1 are shown in FIG. 2 as dashed elements surrounding their respective circuitry with the oscillator 14 and transformer 16 combined within a single dashed element.

As previously noted, the pre-regulator of block 12 is shown as having an input of +28 V dc, but the pre-regulator is designed to operate with an input that may vary between +21 V to +35 V. Transistors Q2 and Q3, 2N2905A and 2N4236 PNP, bipolar transistors, respectively, along with resistors R1, R6 and R10, 30Ω, 470Ω, and 2.7KΩ, respectively, function as an input current limiter. R1 is a current sense resistor that sets the current limit, so that a predetermined value of R1, multiplied by the input current, develops a voltage that turns on Q2. Specifically, whenever the emitter-base junction of Q2 exceeds about 0.6 V, i.e., the voltage across R1 and R6, Q2 will be turned on. When Q2 turns on, its collector voltage, ignoring the collector-emitter saturation voltage, will equal the power supply input voltage. This, in turn, pulls up the voltage of the base of Q3 with respect to its emitter, and therefore limits the conduction of Q3 and thus, limits the current into the oscillator. Diode D2, a 1N3600 common signal type diode, is a protective device for Q3 that allows reverse current to flow. Filter capacitor C39 is a 10 μF electrolytic capacitor that provides a clean dc voltage to the remaining circuitry.

The pre-regulator comprised of transistors Q3, Q4, Q14, the latter two transistors being 2N2222A, NPN, bipolar transistors, diode D1, a 1N4627, C3, a 0.1 μF electrolytic capacitor, and resistors R7, R17, R70 and R71, 7.5 kΩ, 6.2 kΩ, 43.2 kΩ, 20 kΩ, respectively. Diode D1 is a 1N4627, 6.2 V Zener diode that, along with C3 and R7, establishes a reference voltage at the base of Q4. Resistors R70 and R71 sense the voltage at the junction of R70 and the collector of Q3, the sense point, and divide this voltage down to a level that can be compared to the reference voltage at the base of Q4. Based on the level of the divider voltage at Q14, a 2N2222A bipolar transistor, Q4 adjusts the base voltage of Q3. In this way, the drive voltage applied to Q3 is adjusted to control the voltage drop from collector to emitter, and thus regulates the voltage at the sense point. The sense point, in essence, represents the regulated voltage prior to filtering.

Diode D3, a 1N3600 signal level diode, eliminates reverse current flow to allow susceptibility tests to be conducted without energy flowing back to the source. Inductor L2 is a common mode choke, with 24 μH per winding, that reduces common mode noise by using its transformer action to prevent like noise on both sides. Components L1, C6, R22 and C7, 469 μH, 6.8 μF, 2.2Ω, 25 μH, respectively, make up a low pass input filter that reduces high frequency noise at the input to the oscillator comprised of components in block 14.

To start oscillation, resistor R24, 27 kΩ, must see a dc level high enough to turn on Q7, a 2N3019, NPN bipolar transistor. When conducting, this transistor allows current flow through the primary, of transformer T1 and its feedback windings. This transformer has 20 turns for the primary winding, labeled 1-2, 361 turns for the secondary winding, labeled 5-6, 6 turns for the feedback winding, labeled 3-4, and 16 turns for the auxiliary winding, labeled 7-8 and 9-10. The feedback winding develops a negative voltage that appears at the transistor side of capacitor C9, 0.015 μF, sufficient in magnitude to turn off transistor Q7. As this voltage decays, Q7 once again starts conducting with the current furnished through resistors R24 and R27, 470 Ω, the bias for Q7 being established by R26, 1.5 kΩ, as well as R24 and R27. Diode D7, a 1N3600 signal diode, keeps Q7 from becoming saturated. The emitter of Q7 is floating with respect to ground. The oscillator develops an almost pure sinusoidal output across the primary of transformer T1, and, in turn, across the step-up secondary of transformer T1. The absence of harmonics simplifies the filtering scheme for the power supply when there are significant filtering requirements for the power supply output.

As previously described, transformer T1 has two secondaries, one of which is described as the auxiliary winding. Winding 5-6 is the high voltage winding that feeds the voltage multiplier. Auxiliary windings 7-8 and 9-10, each having 16 turn bifilar windings, which, when tied together, make up a center-tapped auxiliary. The voltages at each side of the auxiliary are rectified to produce two low magnitude dc voltages that are employed as supply voltages for the components in the feedback network 24.

A protective circuit associated with transformer T2, and transistor Q8, and a 2N6796 field effect transistor, is designed to disable oscillator 14, and thus the high voltage output, when the power supply output at K exceeds a predetermined excessive output current. A current monitor at the external load (not shown) senses any over-current condition and sends a change-of-level voltage to the protective circuit. Here, the change-of-level voltage is a level change from the normal operating signal level of 0 V, to +5 V, for output disable. When 0 V is applied to R34, transistor Q8 is off and transformer T2 effectively appears as an open circuit at winding 3-4, having 7 turns, and a very high resistance at winding 1-2, having 50 turns. This high resistance appears in shunt with the Q7 biasing network, described above, and, because of its magnitude, it has no affect on the operation of the oscillator. Alternatively, when a +5 V level change occurs, indicating an over-current condition, and is applied at the 1 kΩ resistor R34, transistor Q8 is turned on and winding 3-4 of T2 is effectively short-circuited. This creates a low resistance at winding 1-2, diverting current from transistor Q7's base, causing oscillator shut-down, and, in turn, causing the shut-down of power supply 10. R31, a 100 kΩ resistor, and C36, a 0.01 μF capacitor are the bias network for transistor Q8. Resistor R25, 1.87 kΩ, and C8, a 4.7 μF capacitor, are tuned to an impedance appropriate to allow the oscillator to both turn off as well as start up again.

Winding 5-6 of transformer T1, the step-up secondary, is the high voltage winding that develops a sinusoidal voltage of about 1000 V peak-to-peak when driven by the oscillator. This voltage, at winding point 5, output A, is applied to voltage multiplier 18 at input A, depicted in FIG. 3, and is converted to a dc voltage with a level increase of approximately N*V, where N is the number of stages in the multiplier and V is the peak-to-peak voltage of transformer T1's high voltage secondary winding 5-6. A complete multiplier stage includes 2 diodes and 2 capacitors. On the negative half cycle of T1, current flows from ground through the forward-biased diodes D13, D15, D17 and D19, each of which is an HRF 30 signal diode, to charge up the associated 620 pF capacitors, C16, C20, C23 and C26. For the first stage, the capacitor, C16, is charged to a voltage approximately equal to Vs-Vr, where Vs is the peak-to-peak voltage on the secondary and Vr is the voltage at the collector of Q5, i.e. the voltage output from regulator 26. It should be noted that both Q5 and Q6 are NPN bipolar junction transistors with very high VCE characteristics, manufactured by Solid State Devices, Inc. When the secondary of T1 reaches the peak of the positive half cycle, D14, D16, D18 and D20 are conducting and current will flow through the forward-biased Zener diodes D5 and D6 to charge their associated 620 pF capacitors, which for the first stage is C18. With the secondary and capacitor C16 in series, C18 will charge to the sum of their potentials, 2Vs-Vr. The remaining stages have similar operation with the alternating cycles of transformer T1 and charging of capacitors in the multiplier stack. The output voltage is summed over the lower series of capacitors, C18, C22, C25, C29, to yield N(2Vs-Vr). While there are four stages described in the instant embodiment, this can be expanded or reduced to achieve a desired output voltage appearing between output K and ground L, with ground L being isolated from round J.

The high voltage output from the multiplier appears at the cathode of D20 and is on the order of 2–4 kV dc, with a significant component of ac ripple. This voltage is applied to output filter 20, which reduces the amount of ripple to an acceptable level at the external load point. Output filter 20 is represented here as a two-stage RC filter provided by 68KΩ resistors R54, R55, and capacitors C27, C30, which are both 2200 pF. The filter is designed with a predetermined cutoff frequency, but its cutoff frequency and amount of attenuation can be adjusted by altering the component values and number of stages, and thus, can be tailored to individual needs.

The output of filter 20, at the C30-R55 junction, drives internal load 22, which includes short circuit protection as well as output voltage conditioning for feedback network 24. The resistor R60, 100 kΩ, operates as passive protection of the power supply in the event of a short circuit appearing at the external load. The internal load consists of resistors R64, R65 and R63, which are 200MΩ, 200MΩ and 800 kΩ, respectively. This resistors sense the output and divide the high voltage down, at the junction of R65 and R63, indicated as output G, to a level acceptable for feedback network 24. The capacitor C31, 100 pF, both filters high frequency waveform components appearing at the output of the junction, and also reduces the risk of damage to the feedback network in the event of a partial discharge in the high voltage section.

Figure 4:
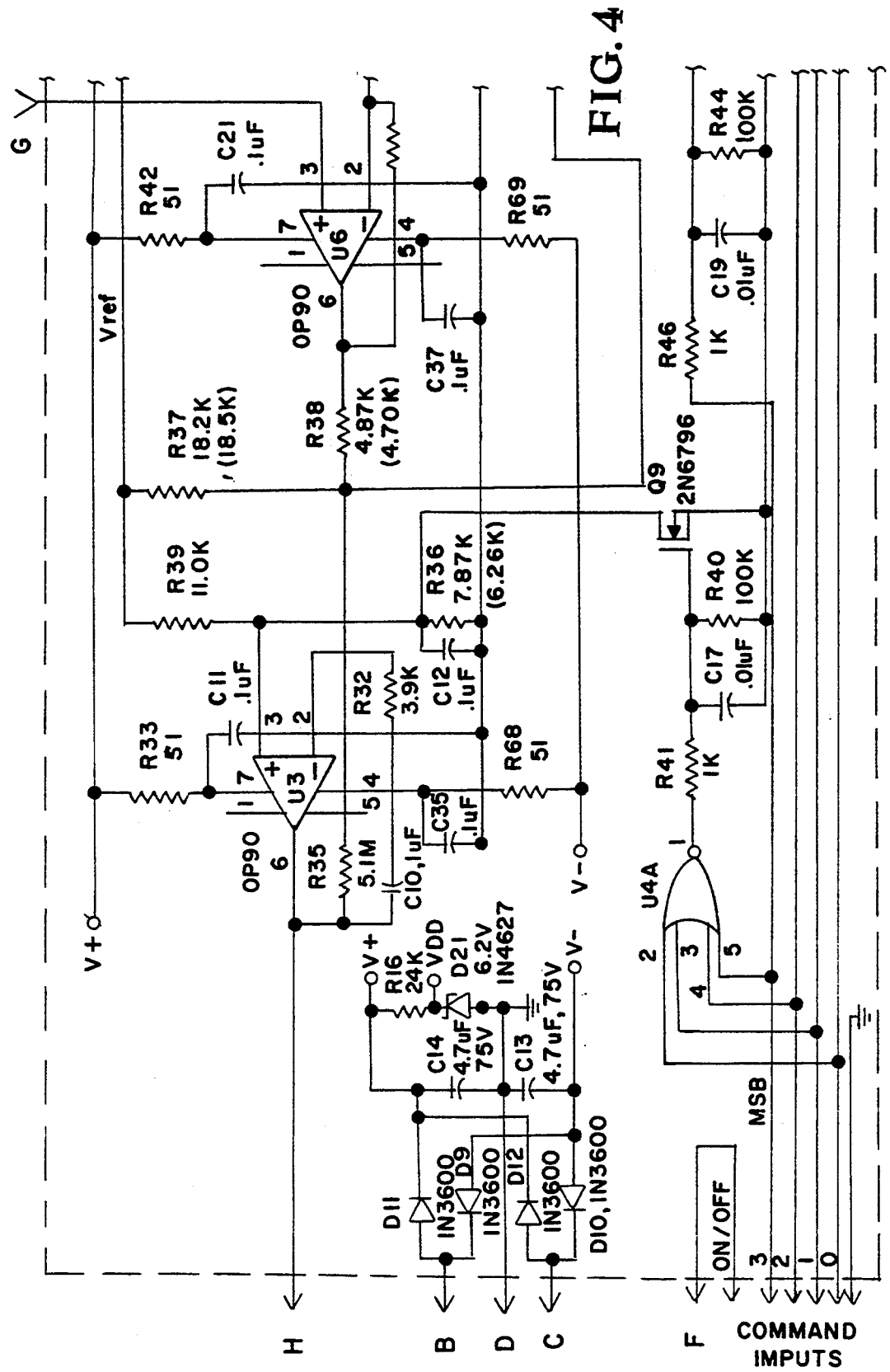

Feedback network 24, depicted in FIG. 4, accepts the divided down high voltage output, from output G of internal load 22 (FIG. 3) to its input G compares this to a reference and to the programmed output level, then drives regulator 26. The feedback network includes voltage reference U7 and operational amplifiers U3, U5 and U6, all of which are powered by the low magnitude dc voltages described above, which is applied to the microcircuits through the buffer resistors R61, R33, R42, R47, R68 and R69, all of which are 51Ω and filtered by capacitors C32, C11, C21, C34, C35 and C37, all of which are 0.1 μF. Precision Monolithics, Inc. (PMI), microcircuit U7 is employed as a precision reference for the control circuitry in network 24. The microcircuit U7 output is +10.0 V and is divided down by resistors R56 and R57, 10.5 kΩ each, to provide a divided down reference voltage to the input to microcircuit U6. (U1 thru U3 and U5 and U6 are PMI OP9-0AZs.) In practice, a resistor R72 will be placed in parallel with R57 and to slightly vary R57 to attain a more precise predetermined value. Microcircuit U6 is an operational amplifier ("op-amp"), used in a voltage follower configuration, that acts as a buffer with an output equal to the divided down voltage at its input terminal 3. R51, 5.1 kΩ, provides the gain of 1 for the op-amp. The U6 output voltage provides a second reference voltage for op-amp U5 and determines, in part, the level of the high voltage output. An adjustment in the output of microcircuit U6 will raise or lower the output of power supply 10. Op-amp U5 has as its inputs the second reference voltage applied to the inverting input through R49 and the divided down high voltage output which is applied to the non-inverting input. These two signals are compared and an error voltage is developed at the output of op-amp U5. The error is multiplied by the gain of U5, which is determined by resistor R45, 43.2 kΩ, and resistor R49, 20 kΩ, and the resultant product appears at the op-amp U5 output pin 6. This signal, through current-limiting resistor R38, having a value of 5.62 kΩ, appears at the inverting input terminal of op-amp U3, along with the reference voltage which is applied to the same terminal through resistor R37, 14.7 kΩ. The signal from U5 is adjusted at this terminal by the circuitry which sets the desired programmable high voltage output. The circuitry is made up of resistors R43, R48, R52 and R62, which are 20 kΩ, 40.2 kΩ, 80.6 kΩ, and 160 kΩ, respectively, the programming resistors, as well as 2N6796 field effect transistors (FETs) Q10 through Q13. Capacitors C19, C24, C28 and C33, all of which are 0.01 μF, along with resistors R46, R44, R53, R50, R59, R58, R67 and R66, which are 1 kΩ, 100 kΩ, 1 kΩ, 100 kΩ, 1 kΩ, 100 kΩ, 1 kΩ and 100 kΩ, respectively, operate as bias networks for FETs Q10 through Q13. In normal use, when a positive external voltage level is applied at one of these bias networks, to the 1 kΩ resistor, the corresponding FET will turn on, switching the corresponding programming resistor into the circuit because the FET is conducting and therefore connects its programming resistor to ground. Alternatively, when the applied external voltage is ground, the corresponding FET will be turned off, thus disconnecting the corresponding programming resistor from the circuit because the FET, when off, acts as an open circuit, thus effectively leaving the programming resistor floating, i.e., lacking a return. The provision for digital programming to the FETs allows for any combination of programming resistors in operation. Thus, these FETs act to switch the programming resistors, R43, R48, R52 and R62, in and out of the inverting input of op-amp U3 to change the amount of resistance, and thus voltage level, at this input. In particular, these resistors change the condition of the inverting input of op-amp U3, and thus, the output of op-amp U3. The switching of these resistors indirectly provides the programmability of the power supply output, which will be further described. Because the resistance values of the programming resistors are multiples of 1, 2, 4 and 8, respectively, of the lowest value, a 4-bit binary code is produced. This results in 16 different programmable levels, and, therefore, 16 different voltage levels at the power supply output. More output levels may be attained by expanding the binary code arrangement with additional programming resistors and their corresponding networks.

Op-amp U3 is set up as a comparator with compensation. The voltage appearing at pin 2 of op-amp U3 is compared to a third reference voltage appearing at pin 3 of op-amp U3, which is divided down from precision reference U7 by resistors R39, 11 kΩ, and R36, 6.19 kΩ. A 0.1 μF capacitor C12 is included to filter the pin 3 reference. A high gain results from resistor R35's high value, 5.1MΩ, and this provides comparator action for the input reference signals. R35 is the feedback resistor connecting between the inverting input to the output of op-amp U3. Control loop compensation is included in the feedback path of op-amp U3 by 3.92 kΩ resistor R32 and 0.22 µf capacitor C10. The output of op-amp U3 is the output of feedback network 24 and is designated as output H. It drives regulator 26 and controls the conduction of bipolar NPN transistors Q5 and Q6, both 2N5097 transistors, that function as series regulator elements by adjusting the amount of base current being injected into both of the transistors.

A larger shift in the high voltage output may be obtained by turning the 2N6796 FET Q9 on by an external level shift. With Q9 on, pin 3 of op-amp U3, the third reference, is effectively shorted to ground, and, thus, the drive to regulator 26 will be adjusted to lower the high voltage output by 1000 V. The control of FET Q9 may be explained by the following. Resistors R41, 1 kΩ, and R40, 100 kΩ, and a 0.01 µf capacitor C17 form the bias network for transistor Q9. Microcircuit U4A, CD4002, is a quad input NOR gate that will have a low voltage level output, a digital zero, except in the case of all zeros on its input. A parallel command of all zeroes being applied to its input will result in a drop in the output of power supply 10 of approximately 1000 V.

Figure 5:
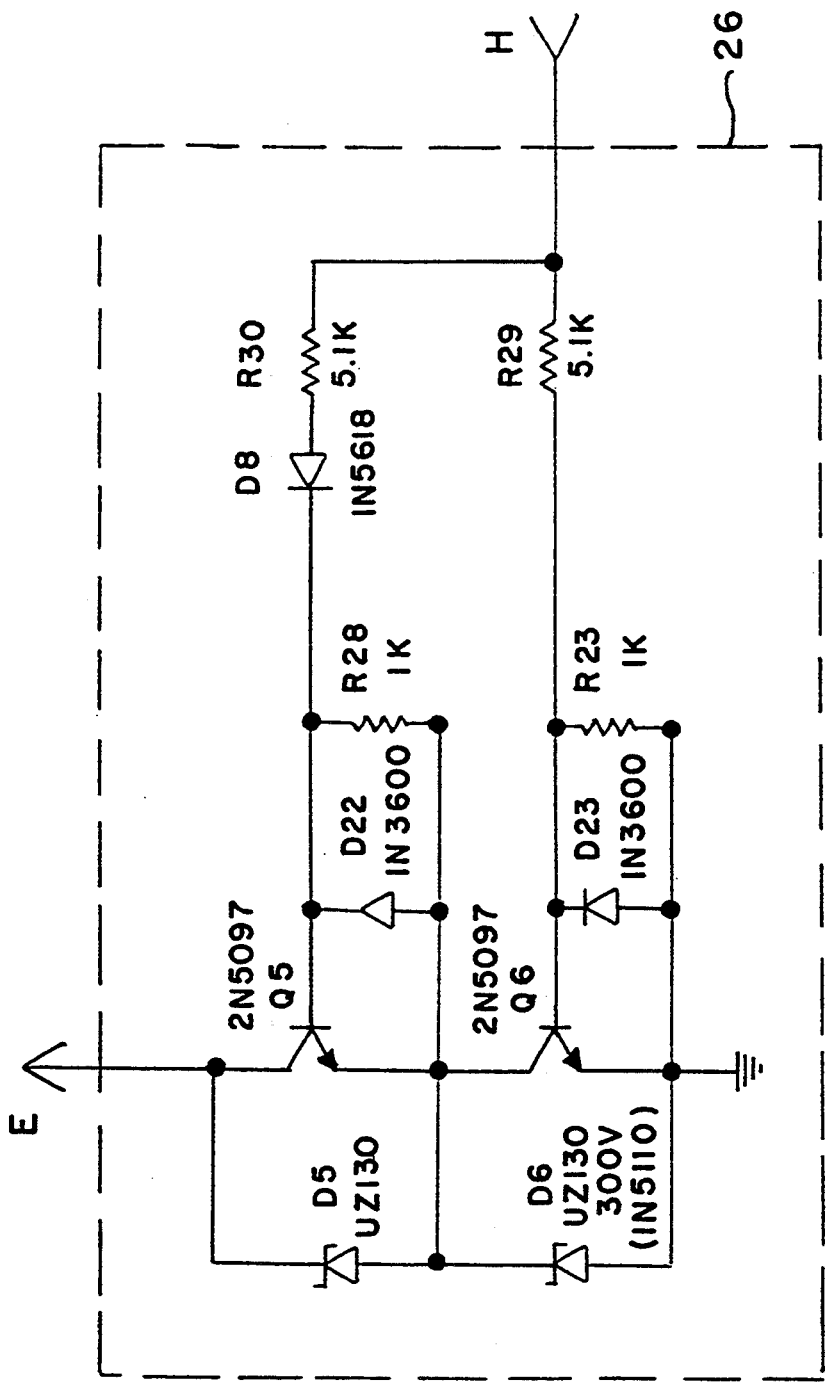

Regulator 26 is shown in FIG. 5. The components in regulator 26 adjust the amount of voltage at the input to the voltage multiplier, and thus, at the output J of power supply. Therefore, controlling the conduction of transistors Q5 and Q6 directly controls the high voltage output. Regulator 26 receives at its input H, the output H of feedback network 24, which is the output of U3, in the form of base drive to transistors Q5 and Q6. These two transistors are arranged in totem pole fashion, allowing for a possible large voltage drop in the regulator by reducing the drive, and, therefore, the conduction of one or both of the two transistors. Diodes D5 and D6, both of which are Unitrode UZ130 300 V Zener diodes, protect transistors Q5 and Q6 from damage in an overvoltage situation. They also serve to conduct current in the forward direction when transformer T1 is in its positive half cycle, defined at lead 5 with respect to lead 6. Diodes D22 and D23, both 1N3600s, are clamping diodes used to protect the base-emitter junctions of transistors Q5 and Q6, respectively, from over-voltage. Resistors R28, R30, R23 and R29, 1 kΩ, 10 kΩ, 1 kΩ, and 20 kΩ, respectively, are drive resistors for transistors Q5 and Q6, respectively. Diode D8, 1N5618, is included, along with the resistor drive network R30 and R28, to provide a level shift so that transistor Q5 conducts after transistor Q6 does so. The conduction of transistors Q5 and Q6 takes place in a continuous, analog fashion rather than as a switching function, where first one, Q6, turns on and then the other, Q5, turns on. The output of regulator 26 is in series with the step-up secondary winding of transformer T1 and serves to control the output of power supply 10 by adjusting the conduction of transistors Q5 and Q6, and thus, the input to the voltage multiplier 18. In other words, the entire output of regulator 26 acts as a variable resistance in series with transformer T1's high voltage secondary and the voltage multiplier. Therefore, as the regulator resistance increases, i.e., with lessening conduction of transistors Q5 and Q6, an increasing portion of the transformer secondary voltage drops across it, and less voltage is available at the input of the voltage multiplier, across capacitors C43 and C15. The regulator furnishes a variable subtractive control voltage to the transformer terminal 6. Accordingly, the power supply output is lowered.

As indicated above, and shown in FIG. 4 FETs Q10 through Q13 switch resistors R43, R48, R52 and R62 in and out of feedback network 24 to provide programmability of the power supply output. The gate of each of these FETs is connected to an identical drive network that allows each FET to be turned on or off, depending on the level of the signal applied to the particular bias network. Therefore, any combination of these four resistors can be switched in or out of the inverting input of op-amp U3. Of FETs G10 through G13, those that are switched to a closed condition effectively ground their respective load resistors while those that are switched to an open position effectively leave their respective resistors in an open circuit condition with no effect on op-amp U3. As these resistance values are multiples of 1, 2, 4 and 8, respectively, of the lowest value, a 4-bit binary code is produced. This results in 16 different programmable levels, and therefore, 16 different voltage levels at the overall power supply output K. More output levels can result by expanding the binary code arrangement with additional resistors and their corresponding networks.

We claim:

1. A power supply having an input and an output, including:
    a low voltage section including said input and a high voltage section including said output, said low voltage section being that portion of said power supply on the low voltage side of a step-up transformer and said high voltage section being that portion of said power supply on the step-up side of said step-up transformer;
    the low voltage section having an oscillator that functionally requires the inclusion of said transformer;
    the high voltage section having a voltage multiplier with an input and an output, a feedback network with an input and an output, and a regulator with an input, said regulator being connected to a reference potential and having an output that includes a plurality of elements, each one of which may operate to undergo a continuous variation in voltage appearing across that element, said elements operating sequentially;
    said oscillator being coupled to and driving the input of said voltage multiplier by the step-up side of said step-up transformer;
    said voltage multiplier output being coupled to and driving the input to said feedback network, the output of said feedback network being coupled to and driving the input of said regulator; and,
    the output of said regulator being coupled to the step-up side of said transformer.

2. The power supply of claim 1 wherein said reference potential is provided in said high voltage section.

3. The power supply of claim 1 wherein said low voltage section further includes pre-regulator and filter circuitry having an input and an output, said low voltage section being energized by an unregulated direct current power source, said unregulated direct current power source being inputted to said pre-regulator and filter circuitry.

4. The power supply of claim 3 wherein the output of said pre-regulator and filter circuitry is applied to said oscillator.

5. The power supply of claim 1 wherein said power supply further includes a means to program the power supply to provide the power supply output with predetermined variable potentials.

6. The power supply of claim 1 wherein the waveform generated by said oscillator is essentially one that has a single frequency, free of harmonics.

7. The power supply of claim 1 wherein said regulator output elements are transistors arranged in a totem pole configuration where said sequential operation includes one transistor turning on before another.

8. The power supply of claim 1 wherein the voltage across the high voltage side of said step-up transformer and the regulator output drives the input to said voltage multiplier.

9. A power supply having an input and an output, including:

a low voltage section including said input and a high voltage section including said output, said low voltage section coupled to said high voltage section by means of a step-up transformer, said low voltage section being connected to the low voltage side of said transformer and said high voltage section being connected to the step-up side of said transformer;

said high voltage section including a regulator means, said regulator means being totally contained within said high voltage section and having an output that algebraically adds to the voltage appearing across the step-up side of said transformer, said regulator further having an output that includes a plurality of elements, each of which elements may operate to undergo a continuous variation in voltage appearing across the element, said elements operating sequentially.

10. The power supply of claim 9 wherein said regulator means is directly connected to said step-up side of said transformer.

11. The power supply of claim 10 wherein said high voltage section further includes a feedback network.

12. The power supply of claim 11 wherein said feedback network is connected to said power supply output to sense output condition and is further connected to the input of said regulator means to furnish a control signal.

13. The power supply of claim 9 wherein said power supply further includes a means to program the power supply to provide the power supply output with predetermined variable potentials.

14. The power supply of claim 9 wherein said power supply further includes a filter and pre-regulator circuit having an input and an output and an oscillator, said filter and pre-regulator circuit and said oscillator being contained within said low voltage section of said power supply, said filter and pre-regulator circuit being connectable to an unregulated direct current power source at said input of said filter and pre-regulator circuit and to said oscillator at said output of said filter and pre-regulator circuit, said oscillator being connected to said low voltage side of said step-up transformer.

15. The power supply of claim 9 wherein said regulator output elements are transistors arranged in a totem pole configuration where said sequential operation includes one transistor turning on before another.

16. The power supply of claim 1 wherein the voltage across said transformer step-up side and said regulator output determines the output of the power supply.

* * * * *